(12) United States Patent
Takekawa et al.

(10) Patent No.: US 7,154,702 B2
(45) Date of Patent: Dec. 26, 2006

(54) HEAD ACTUATOR

(75) Inventors: Hiroshi Takekawa, Kawasaki (JP); Shinji Koganezawa, Kawasaki (JP); Tomoyoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 10/051,379

(22) Filed: Jan. 18, 2002

(65) Prior Publication Data

US 2002/0114102 A1    Aug. 22, 2002

Related U.S. Application Data

(63) Continuation of application No. PCT/JP99/03897, filed on Jul. 21, 1999.

(51) Int. Cl.
G11B 5/596 (2006.01)
(52) U.S. Cl. .................................... 360/78.05
(58) Field of Classification Search ............. 360/78.05, 360/265.2, 291.9, 294.1
See application file for complete search history.

(56) References Cited

U.S. PATENT DOCUMENTS

| | | | | |
|---|---|---|---|---|
| 5,764,444 A | * | 6/1998 | Imamura et al. | 360/294.4 |
| 5,856,896 A | * | 1/1999 | Berg et al. | 360/245.3 |
| 5,936,805 A | * | 8/1999 | Imaino | 360/294.5 |
| 5,978,752 A | * | 11/1999 | Morris | 702/186 |
| 5,995,334 A | * | 11/1999 | Fan et al. | 360/294.3 |
| 6,034,834 A | * | 3/2000 | Yoshikawa et al. | 360/75 |
| 6,038,105 A | * | 3/2000 | Wood et al. | 360/265.6 |
| 6,043,957 A | * | 3/2000 | Hattori et al. | 360/294.3 |
| 6,100,623 A | * | 8/2000 | Huang et al. | 310/317 |
| 6,233,124 B1 | * | 5/2001 | Budde et al. | 360/294.4 |
| 6,268,983 B1 | * | 7/2001 | Imada et al. | 360/294.3 |
| 6,331,923 B1 | * | 12/2001 | Mei | 360/294.4 |
| 6,507,463 B1 | * | 1/2003 | Boutaghou | 360/294.3 |
| 6,621,653 B1 | * | 9/2003 | Schirle | 360/78.12 |

FOREIGN PATENT DOCUMENTS

| | | |
|---|---|---|
| JP | 9-082048 | 3/1997 |
| JP | 9-161425 | 6/1997 |
| JP | 9-251739 | 9/1997 |
| JP | 11-162129 | 6/1999 |

* cited by examiner

Primary Examiner—K. Wong
(74) Attorney, Agent, or Firm—Creer Burns & Crain, Ltd

(57) ABSTRACT

Disclosed herein is a head actuator for a head provided so as to accessible to a disk-shaped recording medium rotating above a base. The head actuator includes a main actuator driven so as to rotate above the base, and a microactuator driven so as to swing relative to the main actuator. The head is mounted on the microactuator. The main actuator and the microactuator are controlled so that the head is moved in a substantially radial direction of the recording medium and positioned over a desired track of the recording medium. A primary resonant frequency of mechanical characteristics of the main actuator is set to 100 Hz or higher. This setting may be achieved by increasing a preload in a ball bearing of the main actuator, for example, to thereby increase the rigidity of a nonlinear spring of the ball bearing. In the case that a disturbance acts on the main actuator, the above setting allows a reduction in displacement of the microactuator required for positioning of the head over the desired track.

20 Claims, 6 Drawing Sheets

F I G. 3A
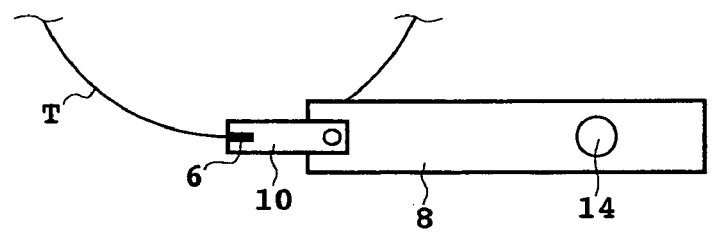
F I G. 3B
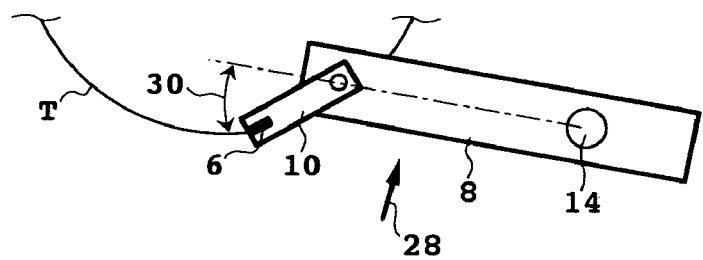
F I G. 3C
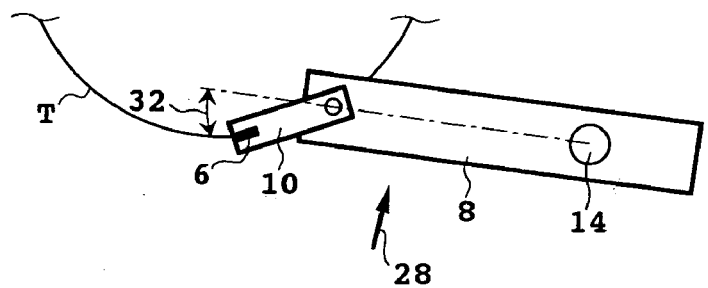

HEAD ACTUATOR

This is a continuation of International PCT Application No. PCT/JP99/03897 filed Jul. 21, 1999, which was not published in English.

BACKGROUND OF THE INVENTION

1. Field of the Invention

The present invention relates generally to a head actuator for a head provided so as to be accessible to a disk-shaped recording medium, and also to a disk drive having the head actuator. More particularly, the present invention relates to an improvement in a double actuator including a main actuator and a microactuator driven independently of the main actuator.

2. Description of the Related Art

A disk drive such as a magnetic disk drive is used as a recording device for a computer. The disk drive known in the art includes a disk-shaped recording medium adapted to rotate, a head provided so as to be accessible to the recording medium, and a head actuator for moving the head in a substantially radial direction of the recording medium to position the head over a desired track of the recording medium. In a magnetic disk drive, for example, a magnetic disk is used as the recording medium, and a thin-film magnetic transducer for reading and/or writing data is used as the head. The magnetic disk is rotationally driven at a high speed by a motor in a housing (or disk enclosure), and the head is mounted on a slider having a specific shape for providing an air bearing produced by the high-speed rotation of the magnetic disk. The head mounted on the slider is driven in a radial direction of the magnetic disk by the head actuator.

To increase the amount of data to be stored per unit surface area of the disk (surface density), the write head must write more data on a narrower track of the disk. The surface density can be increased by increasing the number of data tracks of the disk on which the write head can record data. The parameter representation relating to the surface density is a track density or TPI (tracks per inch). Increasing TPI means a reduction in width of each track. Accordingly, it is necessary to improve a positioning accuracy of the magnetic head. For example, when TPI is increased to 25000, the track pitch becomes 1 im and the positioning accuracy of the magnetic head must be 0.1 im or less.

In a magnetic disk drive having a general head actuator, an actuator arm is rotatably mounted on a base of a housing, and a load beam (suspension) is fixed at its base end portion to one end of the actuator arm. A slider having a magnetic head is mounted on a front end portion of the load beam. A coil is mounted on the other end of the actuator arm, and a magnetic circuit including a magnet fixed to the base is opposed to the coil. The coil and the magnetic circuit constitute a voice coil motor. By passing a current through the coil, the coil is energized to rotate the actuator arm, thereby driving the head in a substantially radial direction of the magnetic disk.

Accordingly, by applying a known servo technique to control the current passed through the coil, the head can be positioned over a desired track of the magnetic disk. Basic means for improving the head positioning accuracy is increasing a loop gain of a positioning servo system to increase a crossover frequency of an open loop. However, in the conventional head actuator, the loop gain of the positioning servo system is limited by a natural frequency of a translational vibration mode of the actuator arm due to the rigidity of a bearing. Usually, the natural frequency of this translational vibration mode cannot be rapidly increased over a current value (several kHz), and an increase in the loop gain of the positioning servo system cannot therefore be expected in the configuration of the conventional head actuator. Accordingly, the frequency that can be followed up is limited and high-accuracy positioning of the head is therefore difficult. As a result, an attainable minimum track width is limited and high-density recording of data is therefore difficult.

In view of these circumstances, there has been proposed a so-called double actuator having two actuators that can be driven independently of each other. For example, the double actuator includes a main actuator driven so as to rotate above a base by using a voice coil motor and a microactuator driven so as to swing relative to the main actuator. A head is mounted on the microactuator. For example, the main actuator has an actuator arm formed with a narrow portion. The narrow portion is formed with a plurality of slits. The slits are interdigitally arranged so as to alternately extend from the opposite side edges of the narrow portion. A pair of multilayer piezoelectric elements are provided on the opposite sides of the narrow portion. When a voltage is applied to one of the piezoelectric elements in a direction of expansion of this piezoelectric element, a voltage is applied to the other piezoelectric element in a direction of contraction of this piezoelectric element, thus performing a so-called push-pull operation to thereby drive the microactuator so that it swings relative to the main actuator.

In this manner, the microactuator operates to finely move the head relative to the main actuator, and can perform servo control capable of following up a frequency component higher than that by the main actuator. However, when the frequency that can be followed up is set to a higher value, an attainable maximum displacement of the microactuator tends to decrease. For example, in the double actuator having the above configuration, the attainable maximum displacement of the microactuator is as small as about 2 μm.

In this kind of double actuator, the wind produced by the rotation of the disk acts as a disturbance particularly on the actuator arm of the main actuator. Accordingly, the amplitude of displacement of the microactuator required for positioning of the head over the desired track is increased by the influence of this disturbance. This wind-induced disturbance tends to increase with an increase in rotational speed of the disk.

In a magnetic disk drive, it is highly demanded not only to improve the recording density, but also to increase a response speed. Accordingly, the rotational speed of the disk may further increase to meet the demand for the increase in response speed. When the influence of the wind-induced disturbance increases with the increase in rotational speed of the disk, there is a possibility that the amplitude of displacement of the microactuator may become saturated in controlling the microactuator. The saturation of the amplitude of displacement of the microactuator may cause a problem that the head cannot be servo-controlled as following up a high frequency component to reduce the positioning accuracy (tracking accuracy) of the head.

SUMMARY OF THE INVENTION

It is therefore an object of the present invention to provide a double actuator including a main actuator and a microactuator wherein the displacement of the microactuator required for positioning of a head over a desired track can be suppressed.

It is another object of the present invention to provide a disk drive which can improve the tracking accuracy of the head to a disk by using the above double actuator.

In accordance with an aspect of the present invention, there is provided a head actuator for a head provided so as to be accessible to a disk-shaped recording medium rotating above a base. The head actuator comprises a main actuator driven so as to rotate above the base, and a microactuator driven so as to swing relative to the main actuator. The head is mounted on the microactuator The main actuator and the microactuator are controlled so that the head is moved in a substantially radial direction of the recording medium and positioned over a desired track of the recording medium. This head actuator is characterized in that a primary resonant frequency of mechanical characteristics of the main actuator is set to 100 Hz or higher.

Thus, the primary resonant frequency of mechanical characteristics of the main actuator is set to 100 Hz or higher, so that the displacement of the main actuator influenced by a disturbance induced by the wind due to the rotation of the recording medium can be reduced. As a result, the displacement of the microactuator required for positioning of the head over the desired track can be sufficiently reduced. Simulation results supporting this technical effect will be hereinafter described in detail. For enhancement of this technical effect, the primary resonant frequency of mechanical characteristics of the main actuator is preferably set to 150 Hz or higher. In contrast, conventionally unknown is a head actuator wherein the primary resonant frequency of mechanical characteristics of the main actuator is 60 Hz or higher.

Preferably, the main actuator includes a ball bearing fixed to the base. The ball bearing has a property of a nonlinear spring, and the primary resonant frequency of mechanical characteristics of the main actuator is set according to the rigidity of the nonlinear spring. The rigidity of the nonlinear spring can be increased, for example, (a) by increasing a preload in the ball bearing, (b) by increasing a ball diameter in the ball bearing, or (c) by increasing the viscosity of a grease used in the ball bearing. The primary resonant frequency of mechanical characteristics of the main actuator increases with an increase in the rigidity of the nonlinear spring.

The head actuator may further comprise an elastic member provided between the main actuator and the base. In this case, the primary resonant frequency of mechanical characteristics of the main actuator is set according to the modulus of elasticity of the elastic member. The elastic member may include a flexible printed circuit board for electrically connecting the head to an external circuit.

In accordance with another aspect of the present invention, there is provided a disk drive comprising a base, a disk-shaped recording medium rotating above said base, a head provided so as to be accessible to said recording medium, and a head actuator for moving said head in a substantially radial direction of said recording medium to position said head over a desired track of said recording medium. The head actuator may be provided by the double actuator according to the present invention.

In this disk drive, the tracking accuracy of the head to the recording medium can be increased, so that a recording density can be increased.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 3A to 3C are schematic plan view for illustrating a technical effect obtained by the present invention;

DESCRIPTION OF THE PREFERRED EMBODIMENTS

Figure 1:
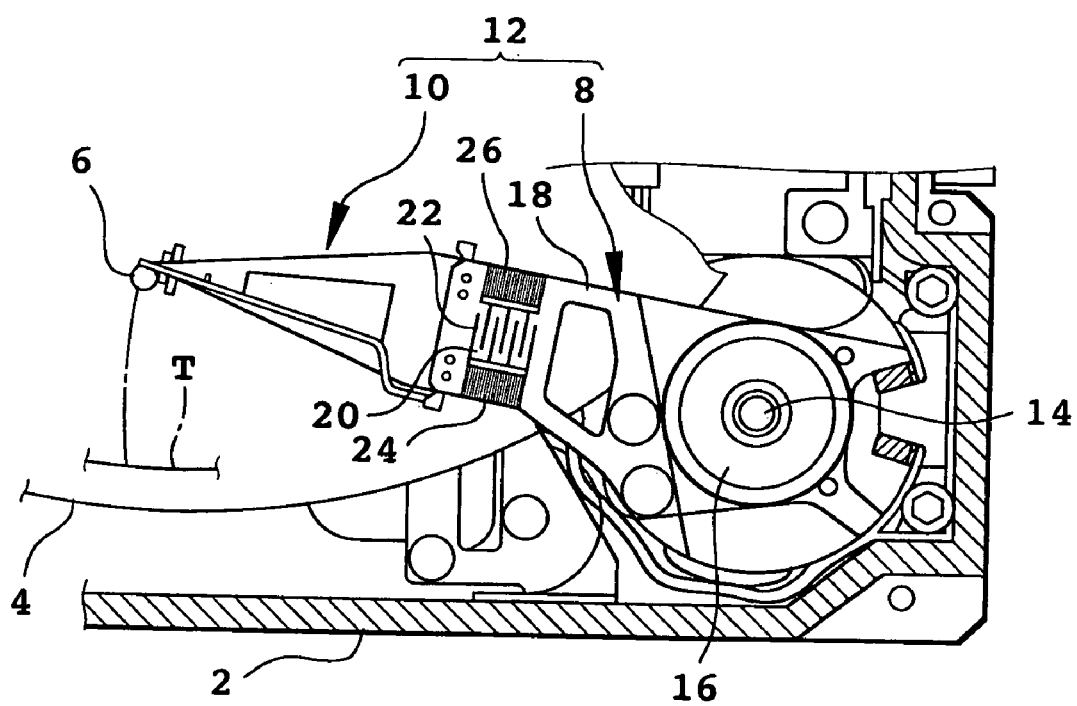
FIG. 1 is a fragmentary plan view showing an internal structure of a hard disk drive as a preferred embodiment of the magnetic disk drive according to the present invention.

Some preferred embodiments of the present invention will now be described in detail with reference to the attached drawings. Throughout the drawings, the same reference numerals denote like or corresponding parts.

FIG. 1 is a fragmentary plan view showing an internal structure of a hard disk drive (HDD) as a preferred embodiment of the magnetic disk drive according to the present invention. A magnetic disk 4 as a recording medium and a head (head slider) 6 are provided above a base 2 of a housing (enclosure) of the HDD. The magnetic disk 4 is rotated at a constant speed by a motor (not shown), and the head slider 6 is opposed to the magnetic disk 4. The head slider 6 is supported above the magnetic disk 4 by an air bearing provided by the rotation of the magnetic disk 4. The head 6 is movable in a substantially radial direction of the magnetic disk 4 by a double head actuator 12 having a main actuator 8 and a microactuator 10.

The main actuator 8 includes a ball bearing 16 fixed to the base 2. An actuator arm 18 of the main actuator 8 is rotatable about a pivot 14 by the ball bearing 16, and the main actuator 8 is rotatably driven by a known voice coil motor. A narrow portion 20 is formed in the vicinity of the front end of the actuator arm 18. The narrow portion 20 is formed with a plurality of slits 22. The slits 22 are interdigitally arranged so as to alternately extend from the opposite side edges of the narrow portion 20. A pair of multilayer piezoelectric elements 24 and 26 are provided on the opposite sides of the narrow portion 20. When a voltage is applied to the element 24 in a direction of expansion of the element 24, a voltage is applied to the element 26 in a direction of contraction of the element 26. Conversely, when a voltage is applied to the element 24 in a direction of contraction of the element 24, a voltage is applied to the element 26 in a direction of expansion of the element 26. Accordingly, the narrow portion 20 is finely oscillated by such a push-pull operation of the elements 24 and 26, and the microactuator 10 can therefore be driven so as to swing about a fulcrum existing in the vicinity of the front end of the main actuator 8.

The head 6 is mounted on the front end of the microactuator 10. Accordingly, by adopting a known servo technique to control each of the main actuator 8 and the microactuator 10, the head 6 can be positioned over a desired track T of the magnetic disk 4. Thus, the head 6 can be accessed to a recording region of the magnetic disk 4 by driving the actuator 12. The inside space of the housing may be closed by mounting a cover (not shown) on the base 2.

Thus, the head actuator 12 configured by combining the main actuator 8 and the microactuator 10 is adopted in this preferred embodiment, so that high-precision positioning of the head 6 can be attained as compared with the case that only the main actuator 8 is used to position the head 6.

Figure 2:
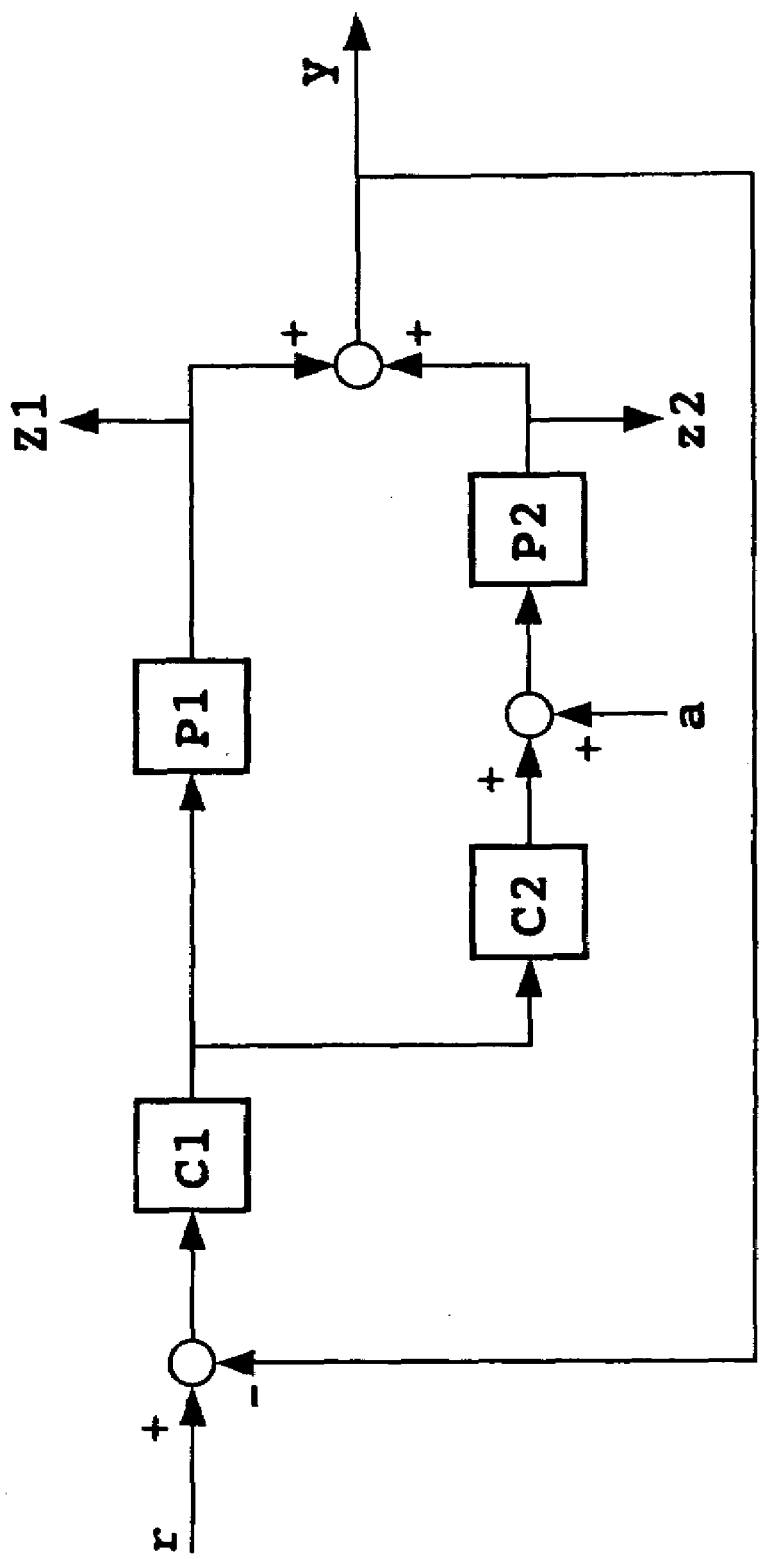
FIG. 2 is a block diagram showing a control system for a head actuator.

FIG. 2 is a block diagram showing a control system for the head actuator 12 shown in FIG. 1. Referring to FIG. 2, C1 denotes a controller for the microactuator 10, C2 denotes a controller for the main actuator 8, P1 denotes a transfer function of a mechanical system for the microactuator 10, P2 denotes a transfer function of a mechanical system for the main actuator 8, r denotes a target value (command value) related to positioning of the head 6, y denotes a displacement of the head 6, z1 denotes a relative displacement of the microactuator 10 to the main actuator 8, z2 denotes a displacement of the main actuator 8, and a denotes a wind-induced disturbance to the main actuator 8.

In the case that the control system as shown in FIG. 2 is adopted, the wind produced by the rotation of the magnetic disk 4 acts as a disturbance to the main actuator 8, especially the actuator arm 18 as described above, causing an increase in amplitude of displacement of the microactuator 10 required for positioning of the head 6 over the desired track T. According to the present invention, the displacement of the microactuator 10 required for positioning of the head 6 over the desired track T is suppressed by increasing a primary resonant frequency of mechanical characteristics of the main actuator 8. This will now be described more specifically.

FIGS. 3A to 3C are schematic plan views for illustrating a technical effect obtained by increasing the primary resonant frequency of mechanical characteristics of the main actuator 8.

FIG. 3A shows a condition where the head 6 is positioned over the desired track T with no disturbance to the main actuator 8. If there are no variations in position of the track T due to eccentricity of the magnetic disk 4 or the like and no disturbance acts on the main actuator 8, the head 6 can be positioned over the desired track T by controlling the microactuator 10 within a very small amplitude of displacement.

FIG. 3B shows a condition where the wind produced by the rotation of the magnetic disk 4 acts as a disturbance to the main actuator 8 as shown by an arrow 28. When the main actuator 8 is displaced by the disturbance, the control system shown in FIG. 2 performs feedback control to displace the microactuator 10 so as to compensate for the displacement of the main actuator 8, thereby positioning the head 6 over the desired track T. However, in the case that the primary resonant frequency of mechanical characteristics of the main actuator 8 is relatively low, the main actuator 8 is largely displaced by the wind-induced disturbance. Accordingly, the microactuator 10 must be largely displaced as shown by reference numeral 30, so as to position the head 6 over the track T.

The displacement of the microactuator 10 required for positioning of the head 6 over the desired track T can be reduced by changing the mechanical characteristics of the main actuator 8 The main actuator 8 influenced by the wind-induced disturbance receives not only a force generated by the control system for positioning the head 6 over the track T, but also a force generated by the property of a nonlinear spring owned by the ball bearing 16 (see FIG. 1), thus determining the position of the main actuator 8. The force by the ball bearing 16 has a direction opposite to the direction of the displacement of the main actuator 8 by the disturbance. By increasing the rigidity of the nonlinear spring of the ball bearing 16 as compared with the case shown in FIG. 3B, the main actuator 8 is less displaced against the wind-induced disturbance. Accordingly, the displacement of the main actuator 8 can be reduced as compared with the case shown in FIG. 3B. This condition is shown in FIG. 3C, wherein the displacement of the microactuator 10 can be reduced as shown by reference numeral 32 by the reduction in displacement of the main actuator 8.

In general, the rigidity of the nonlinear spring of a ball bearing tends to increase with an increase in contact area between each of the inner ring and the outer ring of the ball bearing and the balls interposed between the inner ring and the outer ring. Accordingly, the rigidity of the nonlinear spring can be increased by increasing a preload in the ball bearing or by increasing the diameter of each ball in the ball bearing. As another means, the rigidity of the nonlinear spring can be increased by increasing the viscosity of a grease used in the ball bearing. These typical means for increasing the rigidity of the nonlinear spring may be selectively applied. That is, any one of these typical means may be selected. Further, any two of these typical means may be selected and applied in combination. Further, all of these three means may be applied in combination. More information on the characteristics of the nonlinear spring of a ball bearing is described in detail in Tadayoshi Koizumi and Osamu Kuroda, "Analysis of Damped Vibration under the Action of Rolling Friction", TRIBOLOGIST, Vol. 35, No. 6, (1990), pp. 435–439.

Increasing the rigidity of the nonlinear spring of the ball bearing 16 of the main actuator 8 is equivalent to increasing the primary resonant frequency of mechanical characteristics of the main actuator 8. That is, by increasing the primary resonant frequency of mechanical characteristics of the main actuator 8, the displacement of the main actuator 8 due to the disturbance can be reduced.

Figure 4:
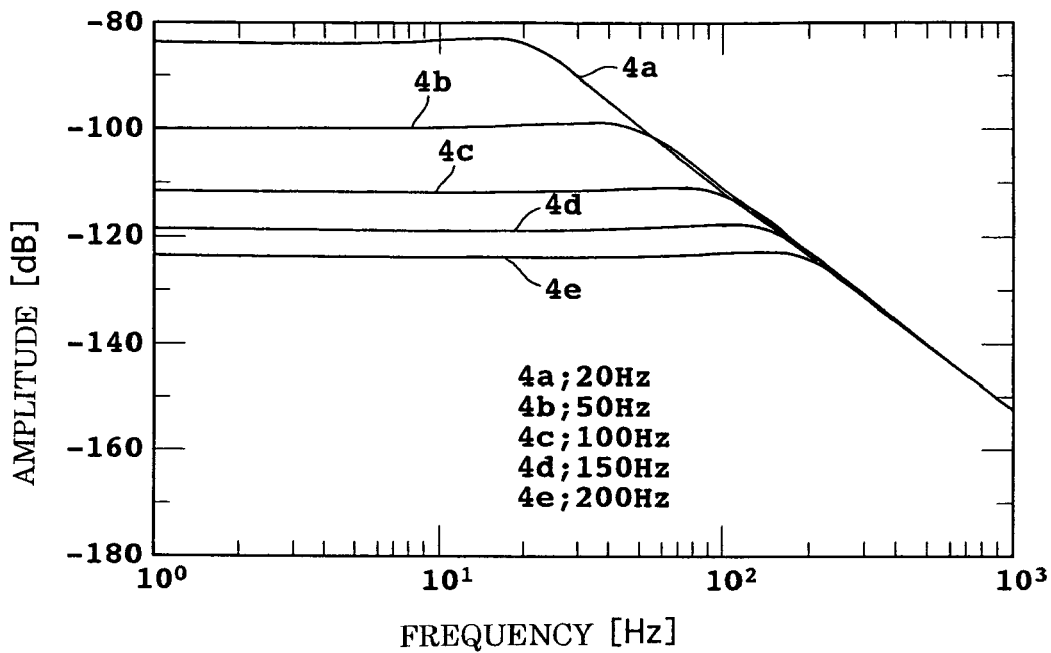
FIG. 4 is a graph showing a simulation result of a frequency response characteristic of a main actuator.
Figure 5:
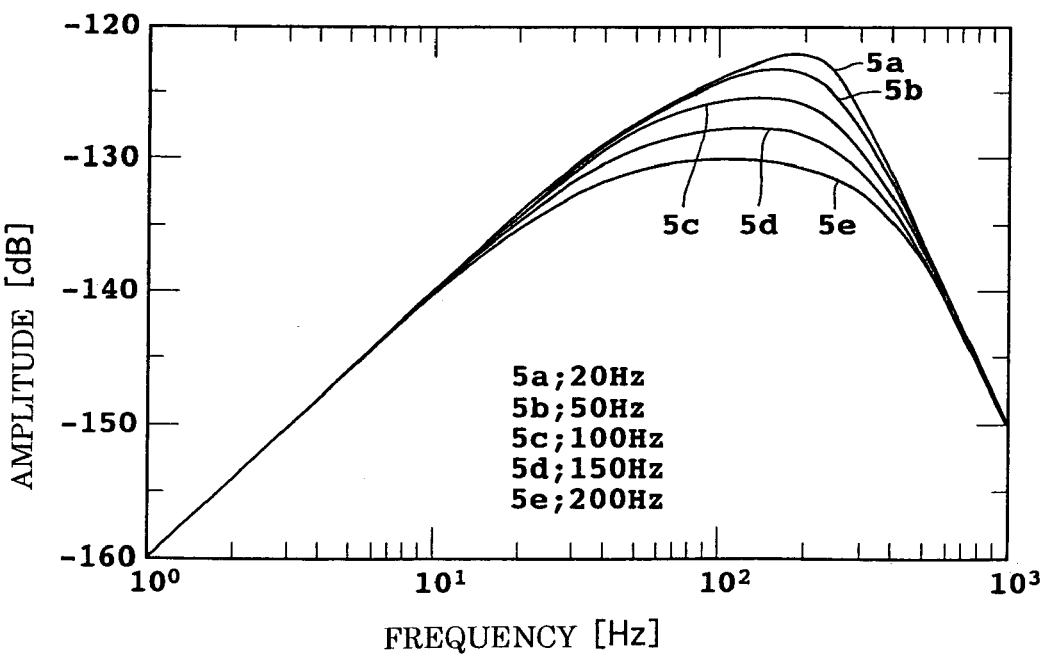
FIG. 5 is a graph showing a simulation result of a spectrum of the displacement of the main actuator influenced by a wind-induced disturbance.
Figure 6:
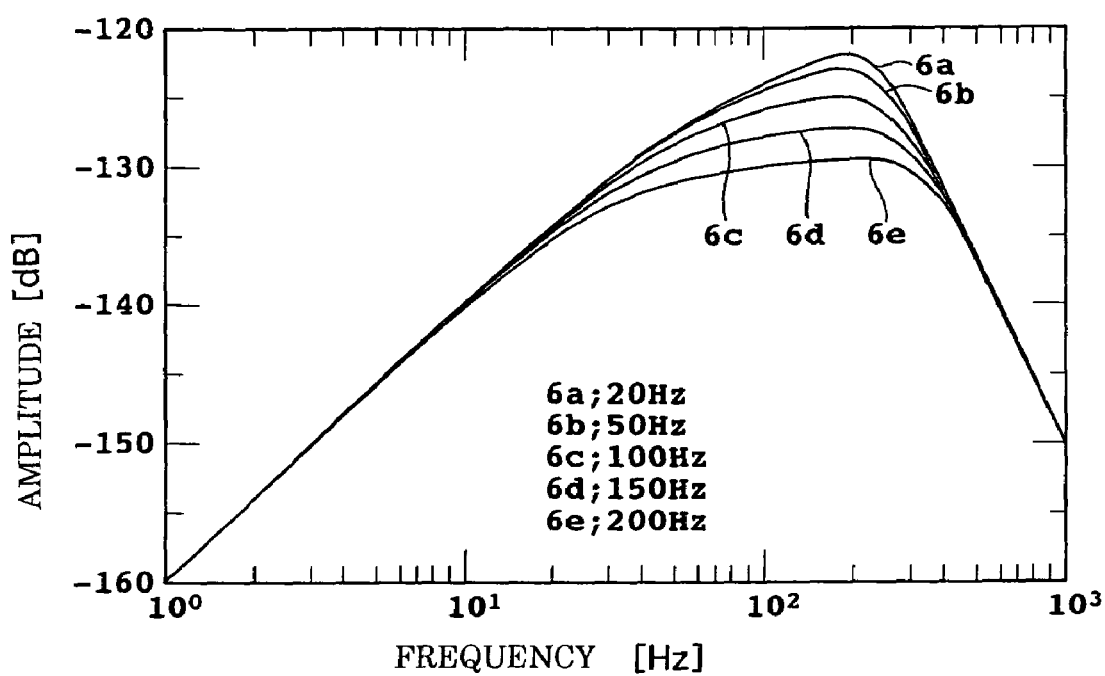
FIG. 6 is a graph showing a simulation result of a spectrum of the displacement of a microactuator influenced by the wind-induced disturbance acting on the main actuator.

Referring to FIGS. 4 to 6, there are shown simulation results for illustrating a reduction in displacement of the microactuator 10 required for positioning of the head 6 over the desired track T by the head actuator 12, by the increase in the primary resonant frequency of mechanical characteristics of the main actuator 8.

FIG. 4 is a graph showing a frequency response characteristic of the amplitude of displacement of the main actuator 8 to a drive current. This characteristic corresponds to the transfer function P2 of the main actuator 8 in the block diagram shown in FIG. 2. Reference numerals 4a, 4b, 4c, 4d, and 4e denote the characteristics at 20, 50, 100, 150, and 200 Hz for the primary resonant frequency of mechanical characteristics of the main actuator 8, respectively. In FIG. 4, the vertical axis represents the ratio of the amplitude to a reference amplitude as expressed in dB, and the horizontal axis represents frequency (Hz) (the same applies also to FIGS. 5 and 6). As apparent from FIG. 4, the higher the primary resonant frequency, the smaller the amplitude. The frequency response characteristic of the displacement of the main actuator 8 to the wind-induced disturbance is similar to the above characteristic shown in FIG. 4. That is, the higher the primary resonant frequency, the smaller the amplitude. This simulation result means that the displacement of the main actuator 8 influenced by the wind-induced disturbance can be reduced by increasing the primary resonant frequency of mechanical characteristics of the main actuator 8.

FIG. 5 is a graph showing a spectrum of the displacement (z2) of the main actuator 8 influenced by the wind-induced disturbance (a). Reference numerals 5a, 5b, 5c, 5d, and 5e denote the spectra at 20, 50, 100, 150, and 200 Hz for the primary resonant frequency of mechanical characteristics of the main actuator 8, respectively. As apparent from FIG. 5, the higher the primary resonant frequency, the smaller the amplitude. This simulation result means that the displacement of the main actuator 8 influenced by the wind-induced disturbance can be reduced by increasing the primary resonant frequency.

FIG. 6 is a graph showing a spectrum of the displacement (z1) of the microactuator 10 influenced by the wind-induced disturbance (a) acting on the main actuator 8. Reference numerals 6a, 6b, 6c, 6d, and 6e denote the spectra at 20, 50, 100, 150, and 200 Hz for the primary resonant frequency of mechanical characteristics of the main actuator 8, respectively. As apparent from FIG. 6, the higher the primary resonant frequency, the smaller the amplitude under the influence of the result shown in FIG. 5. This simulation result means that the displacement of the microactuator 10 required for positioning of the head 6 over the desired track T by the head actuator 12 can be reduced by increasing the primary resonant frequency of mechanical characteristics of the main actuator 8.

According to the calculation based on the above simulation results, the displacement of the microactuator 10 required for positioning of the head 6 over the desired track T by the head actuator 12 is reduced 32% by increasing the primary resonant frequency of the main actuator 8 from 20 Hz to 150 Hz. Further, this displacement is reduced 40% by increasing the primary resonant frequency from 20 Hz to 200 Hz. As an additional effect, power consumption can also be reduced by the reduction in displacement of the microactuator 10.

By setting the primary resonant frequency of mechanical characteristics of the main actuator 8 to 100 Hz or higher in the double head actuator 12 including the main actuator 8 and the microactuator 10 according to this preferred embodiment, the displacement of the microactuator 10 required for positioning of the head 6 over the desired track T can be reduced. As a result, it is possible to provide a magnetic disk drive having a high tracking accuracy of the head 6 to the magnetic disk 4, thereby increasing a recording density on the magnetic disk 4.

Figure 7:
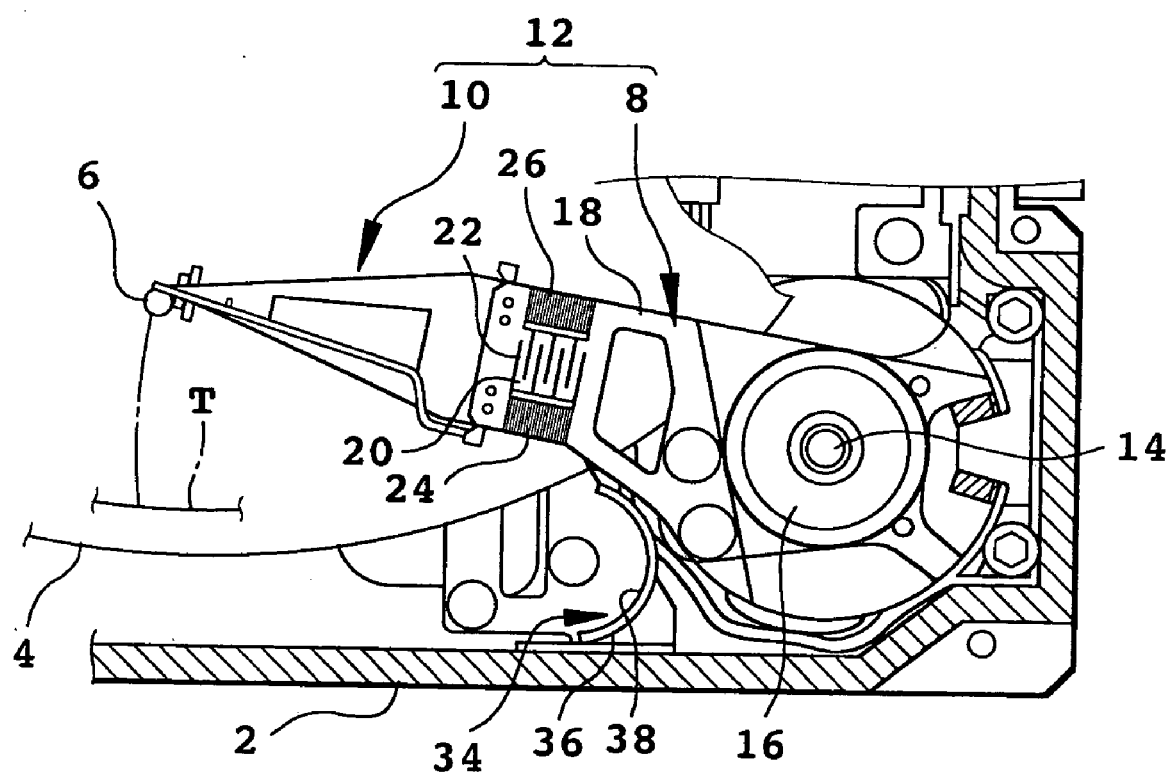
FIG. 7 is a fragmentary plan view showing an internal structure of a hard disk drive as another preferred embodiment of the magnetic disk drive according to the present invention.

FIG. 7 is a fragmentary plan view showing an internal structure of a hard disk drive as another preferred embodiment of the magnetic disk drive according to the present invention. This preferred embodiment is characterized by an elastic member 34 provided between the main actuator 8 and the base 2. The elastic member 34 is a substantially platelike member, and it is attached at its opposite end portions to a side surface of the main actuator 8 and an inside wall surface of the base 2. More specifically, an elastic film 38 is attached to a flexible printed circuit board (FPC) 36 for electrically connecting the head 6 to an external circuit, thereby obtaining a high modulus of elasticity to increase the primary resonant frequency of mechanical characteristics of the main actuator 8. Accordingly, by only adding a simple member (the elastic film 38) without any changes in specifications of the ball bearing 16, the displacement of the microactuator 10 required for positioning of the head 6 over the desired track T can be reduced. A technical effect obtained by increasing the primary resonant frequency and a desirable value of the primary resonant frequency are similar to those mentioned above with reference to FIG. 1, so the description thereof will be omitted herein.

As a modification, the optimum design of the ball bearing 16 in the preferred embodiment shown in FIG. 1 and the use of the elastic member 34 in the preferred embodiment shown in FIG. 7 may be combined to carry out the present invention, thereby further reducing the displacement of the microactuator 10 required for positioning of the head 6 over the desired track T in the double head actuator 12 including the main actuator 8 and the microactuator 10.

While the microactuator 10 configured by using the multilayer piezoelectric elements 24 and 26 is used in each preferred embodiment mentioned above, any other types of microactuators such as a microactuator including a coil and a magnetic circuit may be used.

Further, while the present invention is applied to a magnetic disk drive in each preferred embodiment mentioned above, the present invention may be applied to any other types of disk drives such as an optical disk drive and a magneto-optical disk drive, or may be applied to a head actuator in such a disk drive.

According to the present invention as described above, in the double actuator including the main actuator and the microactuator, the displacement of the microactuator required for positioning of the head over the desired track can be suppressed by suitably setting the primary resonant frequency of mechanical characteristics of the main actuator. By using this double actuator, the tracking accuracy of the head to the disk can be increased, and the rotational speed of the disk can be increased without consideration of the wind-induced disturbance. Accordingly, it is possible to provide a disk drive having a high recording density on the disk and a high-speed response characteristic.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A head actuator for a head provided so as to be accessible to a disk-shaped recording medium rotating above a base, said head actuator comprising:

a main actuator arm having at least one piezoelectric element disposed in the vicinity of a front end of said main actuator arm, wherein said main actuator arm is driven so as to rotate above said base; and a microactuator arm coupled to the front end of said main actuator arm and indirectly driven by said piezoelectric element so as to swing relative to a back end of said main actuator arm, said head being mounted on the end of said microactuator arm, said main actuator arm and said microactuator arm being controlled so that said head is moved in a substantially radial direction of said recording medium and positioned over a desired track of said recording medium;

a primary resonant frequency of mechanical characteristics of said main actuator arm being set to 100 Hz or higher;

wherein said main actuator arm has a narrow portion in the vicinity of the front end thereof, said narrow portion having a plurality of slits interdigitally arranged so as to alternately extend from the opposite side edges of said narrow portion, and said at least one piezoelectric element includes a pair of piezoelectric elements provided on the opposite sides of said narrow portion.

2. A head actuator according to claim 1, wherein said main actuator arm includes a ball bearing fixed to said base, said ball bearing having a property of a nonlinear spring, said primary resonant frequency being set according to the rigidity of said nonlinear spring.

3. A head actuator according to claim 2, wherein the rigidity of said nonlinear spring is increased by increasing a preload in said ball bearing.

4. A head actuator according to claim 2, wherein the rigidity of said nonlinear spring is increased by increasing a ball diameter in said ball bearing.

5. A head actuator according to claim 2, wherein the rigidity of said nonlinear spring is increased by increasing the viscosity of a grease used in said ball bearing.

6. A head actuator according to claim 1, further comprising an elastic member provided between said main actuator arm and said base, said primary resonant frequency being set according to the modulus of elasticity of said elastic member.

7. A head actuator according to claim 1, wherein said primary resonant frequency is set to 150 Hz or higher.

8. A head actuator for a head provided so as to be accessible to a disk-shaped recording medium rotating above a base, said head actuator comprising:
a main actuator arm having at least one piezoelectric element disposed in the vicinity of a front end of said main actuator arm, wherein said main actuator arm is driven so as to rotate above said base;
a narrow portion disposed on said main actuator arm adjacent said piezoelectric element, said narrow portion having a plurality of slits which permit the extension and retraction of said main actuator arm with the expansion and retraction of said piezoelectric element;
a microactuator arm indirectly driven by said piezoelectric element so as to swing relative to a back end of said main actuator arm, said head being mounted on the end of said microactuator arm,
said main actuator arm and said microactuator arm being controlled so that said head is moved in a substantially radial direction of said recording medium and positioned over a desired track of said recording medium;
a primary resonant frequency of mechanical characteristics of said main actuator arm being set to 100 Hz or higher.

9. A head actuator according to claim 8, wherein said main actuator arm includes a ball bearing fixed to said base, said ball bearing having a property of a nonlinear spring, said primary resonant frequency being set according to the rigidity of said nonlinear spring.

10. A head actuator according to claim 9, wherein the rigidity of said nonlinear spring is increased by increasing a preload in said ball bearing.

11. A head actuator according to claim 9, wherein the rigidity of said nonlinear spring is increased by increasing a ball diameter in said ball bearing.

12. A head actuator according to claim 9, wherein the rigidity of said nonlinear spring is increased by increasing the viscosity of a grease used in said ball bearing.

13. A head actuator according to claim 8, further comprising an elastic member provided between said main actuator arm and said base, said primary resonant frequency being set according to the modulus of elasticity of said elastic member.

14. A head actuator according to claim 8, wherein said primary resonant frequency is set to 150 Hz or higher.

15. A head actuator according to claim 8, wherein said plurality of slits are interdigitally arranged so as to alternately extend from opposite side edges of said narrow portion.

16. A head actuator for a head provided so as to be accessible to a disk-shaped recording medium rotating above a base, said head actuator comprising:
a main actuator arm having two piezoelectric elements disposed in the vicinity of a front end of said main actuator arm, wherein said main actuator arm is driven so as to rotate above said base;
a narrow portion disposed between said piezoelectric elements and having a plurality of slits which permit the extension and retraction of said main actuator arm with the expansion and retraction of said piezoelectric element;
a microactuator arm indirectly driven by said piezoelectric element so as to swing relative to a back end of said main actuator arm, said head being mounted on the end of said microactuator arm,
said main actuator arm and said microactuator arm being controlled so that said head is moved in a substantially radial direction of said recording medium and positioned over a desired track of said recording medium;
a primary resonant frequency of mechanical characteristics of said main actuator arm being set to 100 Hz or higher.

17. A head actuator according to claim 16, wherein said main actuator arm includes a ball bearing fixed to said base, said ball bearing having a property of a nonlinear spring, said primary resonant frequency being set according to the rigidity of said nonlinear spring.

18. A head actuator according to claim 17, wherein the rigidity of said nonlinear spring is increased by increasing a preload in said ball bearing.

19. A head actuator according to claim 17, wherein the rigidity of said nonlinear spring is increased by increasing a ball diameter in said ball bearing.

20. A head actuator according to claim 16, wherein said plurality of slits are interdigitally arranged so as to alternately extend from opposite side edges of said narrow portion.

* * * * *